(12) United States Patent
Niwa et al.

(10) Patent No.: US 8,720,421 B2
(45) Date of Patent: May 13, 2014

(54) TURBO-CHARGING APPARATUS FOR VEHICLE ENGINE

(75) Inventors: Yasushi Niwa, Higashihiroshima (JP); Einosuke Suekuni, Higashihiroshima (JP); Atsuhiro Hatabu, Hiroshima (JP); Satoshi Nishizaka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 239 days.

(21) Appl. No.: 13/159,628

(22) Filed: Jun. 14, 2011

(65) Prior Publication Data

US 2012/0000196 A1    Jan. 5, 2012

(30) Foreign Application Priority Data

Jun. 30, 2010   (JP) ................... 2010-149948

(51) Int. Cl.
*F02B 33/00*    (2006.01)
*F02B 33/44*    (2006.01)

(52) U.S. Cl.
USPC ............... 123/562; 123/564; 60/611; 60/612

(58) Field of Classification Search
USPC ........................................................ 60/612
See application file for complete search history.

(56) References Cited

U.S. PATENT DOCUMENTS

| | | | |
|---|---|---|---|
| 7,360,362 B2 * | 4/2008 | Nicolle et al. | 60/612 |
| 2003/0150408 A1 | 8/2003 | Roithinger | |
| 2006/0137343 A1 * | 6/2006 | Grissom et al. | 60/602 |
| 2009/0265080 A1 * | 10/2009 | Fry et al. | 701/103 |
| 2010/0037606 A1 | 2/2010 | Stilgenbauer et al. | |
| 2012/0000196 A1 | 1/2012 | Niwa et al. | |

FOREIGN PATENT DOCUMENTS

| | | |
|---|---|---|
| DE | 19811782 A1 * | 9/1999 |
| DE | 10230934 B4 | 1/2004 |
| DE | 102006004725 A1 | 8/2007 |
| DE | 102011104450 A1 | 1/2012 |
| EP | 1626169 A1 * | 2/2006 |
| JP | 264725 U | 5/1990 |
| JP | 3104130 U | 10/1991 |
| JP | 03267525 A | 11/1991 |

(Continued)

OTHER PUBLICATIONS

English Translation of EP 1626169 A1.*

(Continued)

*Primary Examiner* — Thomas Denion
*Assistant Examiner* — Jessica Kebea
(74) *Attorney, Agent, or Firm* — Alleman Hall McCoy Russell & Tuttle LLP

(57) ABSTRACT

The disclosure provides a turbo-charging apparatus for a vehicle engine, which includes a first and second turbo-charger, an inter-turbine passage connecting a discharging port of a first turbocharger turbine with an introducing port of a second turbocharger turbine, a bypass passage connecting an introducing passage of the first turbocharger turbine with the inter-turbine passage, and a control valve for opening and closing the bypass passage. The inter-turbine passage extends substantially straight from the discharging port of the first turbocharger turbine toward the second turbocharger when viewed from a direction parallel to turbine shafts of the first and second turbochargers, which are arranged substantially parallel to each other, so that the inter-turbine passage connects with an outer circumferential part of the second turbocharger turbine so as to extend in a direction tangent to an outer circumference direction of the second turbocharger turbine.

16 Claims, 15 Drawing Sheets

(56) References Cited

FOREIGN PATENT DOCUMENTS

| | | |
|---|---|---|
| JP | 5508462 A | 11/1993 |
| JP | 2003-239752 A | 8/2003 |
| JP | 2006-070878 A | 3/2006 |
| JP | 2009-293383 A | 12/2009 |
| WO | 9118190 A1 | 11/1991 |
| WO | 2008083769 A1 | 7/2008 |

OTHER PUBLICATIONS

English Translation of DE 19811782 A1.*
Official Translation of DE 19811782 A1.*
Japanese Patent Office, Notification of Reasons for Refusal of Japanese Patent Application No. JP2010149948, Oct. 1, 2013, 5 pages.

* cited by examiner

|  | STARTING MODE (M0) | LOW SPEED MODE (M1) | INTERMEDIATE SPEED MODE (M2) | INTERMEDIATE-HIGH SPEED MODE (M3) | HIGH SPEED MODE (M4) |
|---|---|---|---|---|---|
| REGULATION VALVE | OPEN | CLOSE | ADJUSTMENT | OPEN | OPEN |
| INTAKE AIR CUTTING VALVE | CLOSE | CLOSE | CLOSE | OPEN | OPEN |
| WASTEGATE VALVE | OPEN | CLOSE | CLOSE | CLOSE | ADJUSTMENT |

TURBO-CHARGING APPARATUS FOR VEHICLE ENGINE

BACKGROUND

The present invention relates to a turbo-charging apparatus for a vehicle engine, and particularly relates to a turbo-charging apparatus for a vehicle engine that is equipped with a first turbocharger and a second turbocharger arranged in series with the first turbocharger.

Conventionally, diesel engines are known in which a fuel consumption can be improved by reducing a mechanical resistance of, for example, bearings through a decrease of a compression ratio in a compression stroke and NOx contained in exhaust gas can be reduced by decreasing a combustion temperature through the decrease of the compression ratio. However, an engine output is reduced when the compression ratio is decreased as described above. For this reason, as an effective method of suppressing the reduction of the engine output while decreasing the compression ratio, a turbo-charging apparatus for turbo-charging intake air by using kinetic energy of the exhaust gas discharged from the engine is widely adopted.

In such turbo-charging apparatuses, there exists a sequential turbo-charging apparatus including a compact turbo-charger for turbo-charging the intake air mainly under a low speed and low load situation and a large turbocharger for turbo-charging the intake air mainly under a high speed and high load situation, and the sequential turbo-charging apparatus can switch turbo-charging characteristics of the compact turbocharger according to an operation state of the engine.

JP2003-239752A discloses a turbo-charging apparatus including, on one side of an engine, a first turbocharger with a larger capacity and a second turbocharger with a smaller capacity arranged at a position higher than the first turbocharger. A second turbocharger compressor is arranged downstream from a first turbocharger compressor, and an intercooler is arranged upstream from a coolant cooler and between the first turbocharger compressor and the second turbocharger compressor. Thereby, an intake pipe between the intercooler and the second turbocharger compressor is minimized in its length and an arrangement space is saved.

The diesel engine includes a large exhaust filter device, for example a DPF (diesel particulate filter), for purifying the exhaust gas, therefore, an arranging layout containing the exhaust filter device in addition to the compact turbocharger and the large turbocharger is proposed.

JP2006-070878A discloses a turbo-charging apparatus including, on one side wall of an engine, a compact turbocharger, a large turbocharger, and a DPF connected with a turbine outlet of the large turbocharger. The large turbocharger is arranged below the compact turbocharger to be offset therefrom, the DPF is arranged below the compact turbocharger and at substantially the same height as the large turbocharger, and an exhaust gas introducing port of the DPF is arranged with its opening facing toward the large turbocharger turbine. Thereby, the DPF, the compact turbocharger, and the large turbocharger can be arranged compactly on the side wall of the engine, the exhaust gas with small exhaust energy loss and high temperature can be obtained, and a turbo-charging performance and a regeneration efficiency of the DPF are improved.

In the turbo-charging apparatus disclosed in JP2003-239752A, the intake pipe can be shortened by arranging the large first turbocharger and the small second turbocharger in two vertical levels. Because the large sized component such as the DPF is equipped near the engine, a layout efficiency is required for, for example, an exhaust pipe and the components in the exhaust system other than the intake pipe. However, no description of a specific layout for the exhaust filter device, such as the DPF, and the components in the exhaust system, such as the exhaust pipe, exists in JP2003-239752A.

In the turbo-charging apparatus in JP2006-70878A, an arrangement space is formed rearward of the engine, and a turbo-charging gas pipe can be installed by utilizing the arrangement space. However, because an inter-turbine passage connecting a discharging part of the compact turbocharger turbine with an introducing part of the large turbocharger turbine passes around the compact turbocharger turbine and is positioned above the compact turbocharger turbine, the inter-turbine passage is formed in a substantially U-shape and the passage length may be long. Thus, a thermal energy of the exhaust gas is discharged outside and such problems as, for example, a decreased turbo-charging efficiency, a decreased regeneration efficiency of the DPF, and a delayed activation of a catalyst become concerns due to a decreased kinetic energy of the exhaust gas when the passage length between the turbines is long.

SUMMARY

The present invention provides a sequential turbo-charging apparatus for a vehicle engine, which can suppress a thermal energy of an exhaust gas from being discharged outside and can achieve a compact layout of components near the engine while maintaining a performance of introducing the exhaust gas into a second turbocharger turbine.

According to an aspect of the present invention, a turbo-charging apparatus for a vehicle engine is provided, which includes a first turbocharger, a second turbocharger, an inter-turbine passage connecting a discharging port of a turbine of the first turbocharger with an introducing port of a turbine of the second turbocharger, a bypass passage connecting an introducing passage of the turbine of the first turbocharger with the inter-turbine passage, and a regulating valve for opening and closing the bypass passage. A turbine shaft of the first turbocharger and a turbine shaft of the second turbocharger are arranged substantially in parallel to each other. The inter-turbine passage extends substantially straight from the discharging port of the turbine of the first turbocharger toward the second turbocharger when viewed from a direction parallel to the turbine shafts of the first and second turbochargers so that the inter-turbine passage connects with an outer circumferential part of the turbine of the second turbocharger so as to extend in a direction tangent to the outer circumference direction of the turbine of the second turbocharger. The inter-turbine passage and the bypass passage are arranged adjacent to each other in a direction parallel to the turbine shafts of the first and second turbochargers and formed integrally with each other.

As described above, the turbine shaft of the first turbocharger and the turbine shaft of the second turbocharger are arranged substantially in parallel to each other, and the inter-turbine passage extends substantially straight from the discharging port of the first turbocharger turbine toward the second turbocharger when viewed from the direction parallel the turbine shafts of the first and second turbochargers. Therefore, the discharging port of the turbine of the first turbocharger and the introducing port of the turbine of the second turbocharger can be connected by a short length passage, and a thermal energy of exhaust gas can be suppressed from being discharged outside.

In one embodiment, the inter-turbine passage, the bypass passage, and the introducing passage of the turbine of the first turbocharger may integrally constitute an exhaust gas passage unit. The exhaust gas passage unit may include a first part on the first turbocharger side and a second part on the second turbocharger side. The introducing passage for guiding exhaust gas from the engine to the turbine of the first turbocharger and a part of an exhaust passage for guiding exhaust gas from the engine to the turbine of the second turbocharger may be formed within the first part of the exhaust gas passage unit.

As described above, the passages between the first turbocharger and the second turbocharger are unitized. Therefore, the first and second turbochargers can easily be supported by the engine, and the maintenance efficiency can be improved.

In one embodiment, the turbine of the first turbocharger may be arranged below the turbine of the second turbocharger.

As described above, the first turbocharger and the second turbocharger can be arranged vertically along a side wall of the engine, and thus the supporting strength of the first and second turbochargers by the engine can be increased while the layout efficiency near the engine is maintained.

In one embodiment, the regulating valve may be provided within a connecting part between the first part and the second part of the exhaust gas passage unit.

As described above, the attaching efficiency of the regulating valve by the exhaust gas passage unit and the maintenance ability of the regulating valve can be secured.

In one embodiment, the regulating valve may be a butterfly valve.

As described above, the opening angle of the regulating valve can be finely adjusted and the turbo-charging adjustment can accurately be controlled.

In one embodiment, the first part and the second part of the exhaust gas passage unit may be coupled to each other within the connecting part via an intermediate member. A part of the bypass passage arranged with the regulating valve and a part of the inter-turbine passage may be formed in the intermediate member.

As described above, the attaching efficiency of the regulating valve by the exhaust gas passage unit and the maintenance ability of the regulating valve can be secured with the simple configuration.

In one embodiment, a part of the inter-turbine passage on the turbine side of the second turbocharger may be an oval shape in cross-section, and the long axis of the cross-section may be oriented substantially orthogonal to the direction along the turbine shaft of the second turbocharger.

As described above, a performance of introducing the exhaust gas into the turbine of the second turbocharger can be maintained high.

DESCRIPTION OF EMBODIMENTS

Hereinafter, embodiments for carrying out the present invention are described in detail.

Note that, in the below embodiments, a front-and-rear axis corresponds to a front-and-rear axis of a vehicle and a right-and-left axis corresponds to a right-and-left axis of the vehicle seen from the rear side.

First Embodiment

Hereinafter, a first embodiment of the present invention is described in detail with reference to FIGS. 1 to 18.

Figure 1:
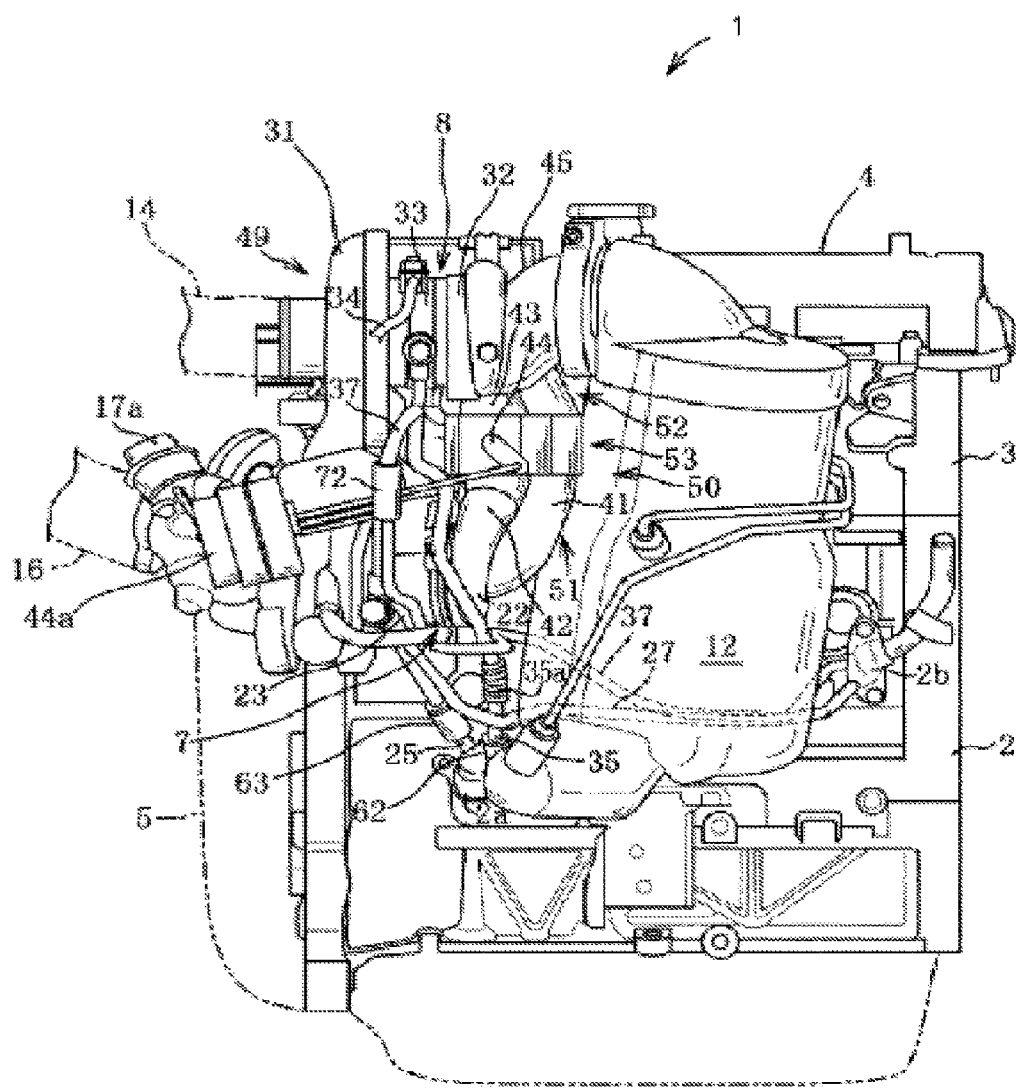
FIG. 1 is an elevational view showing a turbo-charging apparatus for a vehicle engine seen from a vehicle rear side according to one embodiment of the invention.
Figure 2:
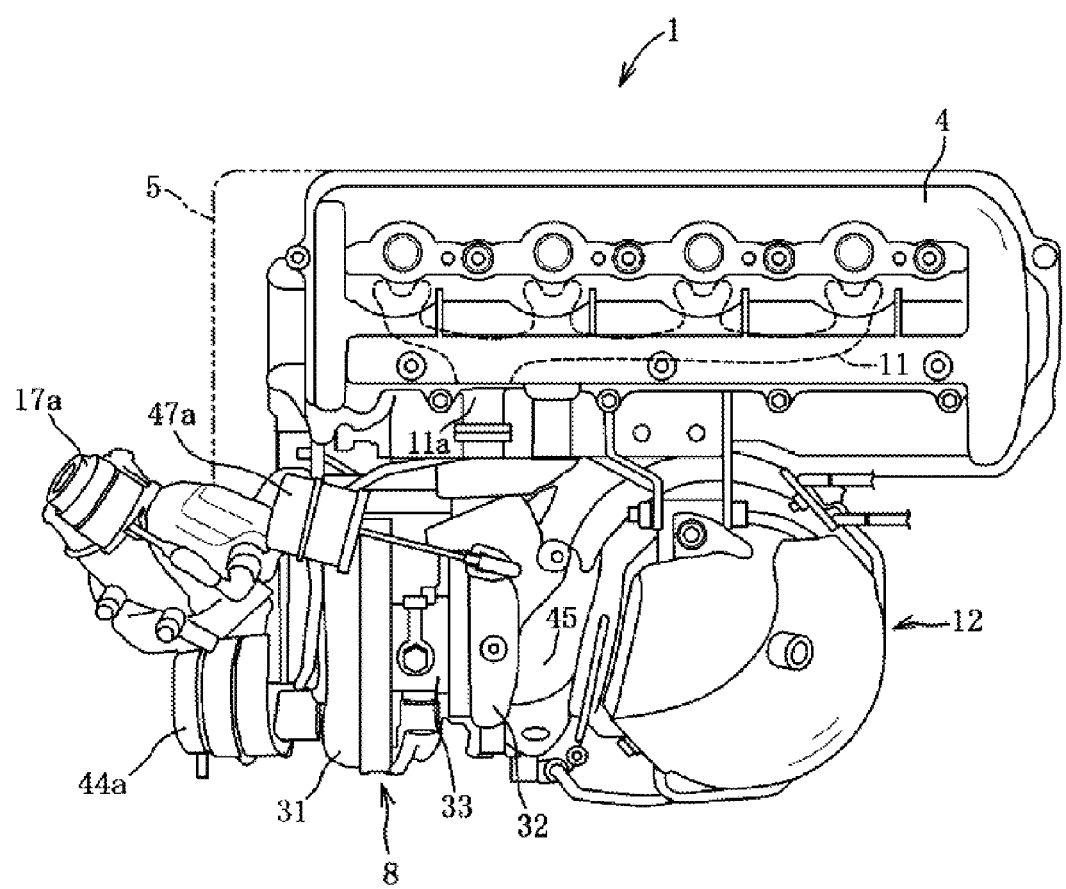
FIG. 2 is a plan view showing the engine seen from above.
Figure 3:
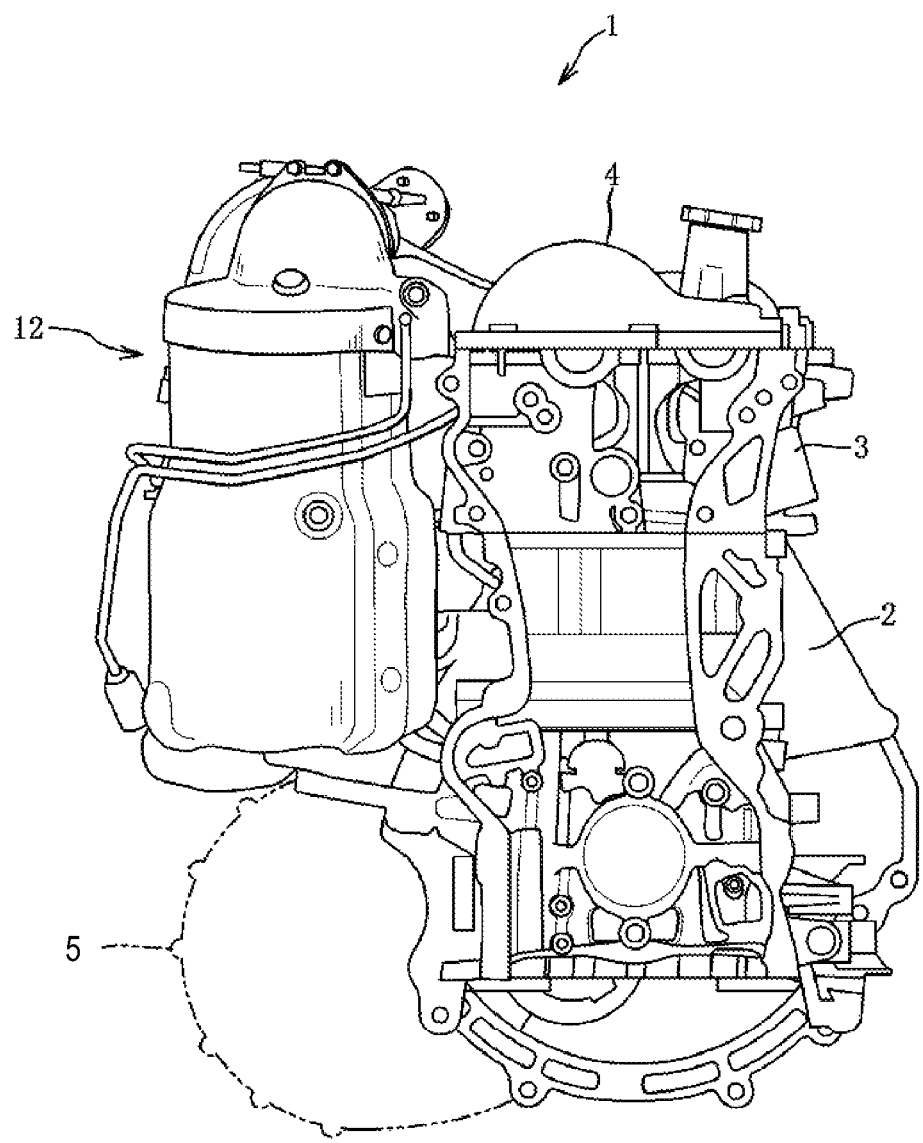
FIG. 3 is a right side view showing the engine.

As shown in FIGS. 1 to 3, an inline-four diesel engine 1 includes, for example, a cylinder block 2, a cylinder head 3 arranged on the cylinder block 2, a cylinder head cover 4 covering an upper part of the cylinder head 3, and a transmission unit 5 arranged on a left side end part of the cylinder block 2.

The engine 1 is arranged transversely so that a direction along a crank shaft (not illustrated) is in parallel to a vehicle axis and intake ports 3a are arranged on the front side and exhaust ports 3b are arranged on the rear side. A compression ratio of the engine 1 in a compression stroke is controlled to be lower (e.g., about 14:1) as compared to a compression ratio of a normal diesel engine. The transmission unit 5 includes a transfer case (not illustrated) for covering the unit, and the transfer case bulges rearward from a rear side wall of the engine 1.

As shown in FIGS. 1 to 3 and 9, an intake system of the engine 1 includes, for example, an air cleaner 6 for removing, for example, dust contained in intake air, a first turbocharger compressor 7a of a first turbocharger 7 having a smaller capacity and for turbo-charging the intake air mainly under a low speed, a second turbocharger compressor 8a of a second turbocharger 8 having a capacity larger than the first turbocharger 7 and for turbo-charging the intake air mainly under a high intermediate speed, an intercooler 9 for cooling the intake air having a high temperature due to being compressed, and an intake manifold 10 for guiding the intake air to the intake ports 3a of the engine 1.

Figure 4:
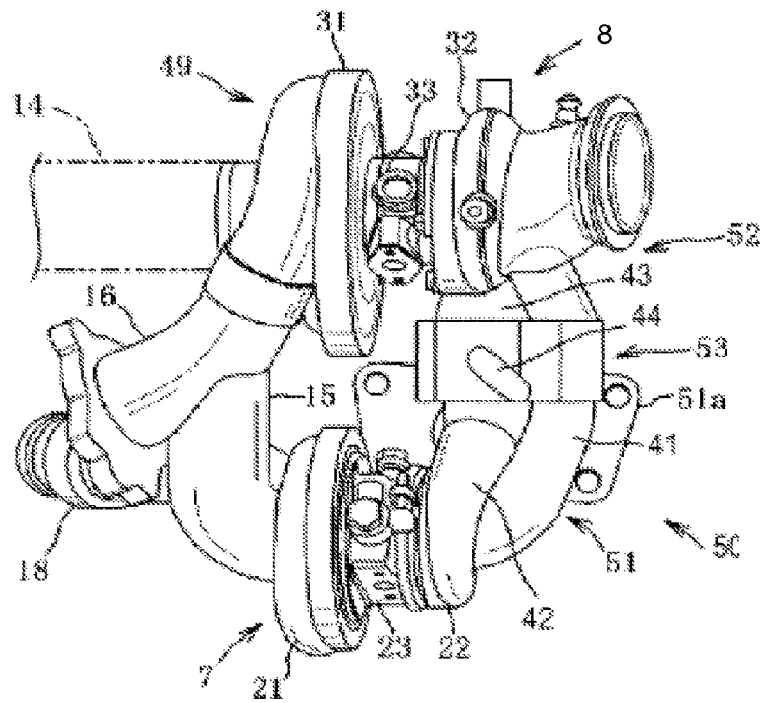
FIG. 4 is an elevational view showing an intake air passage unit and an exhaust gas passage unit seen from the vehicle rear side.
Figure 9:
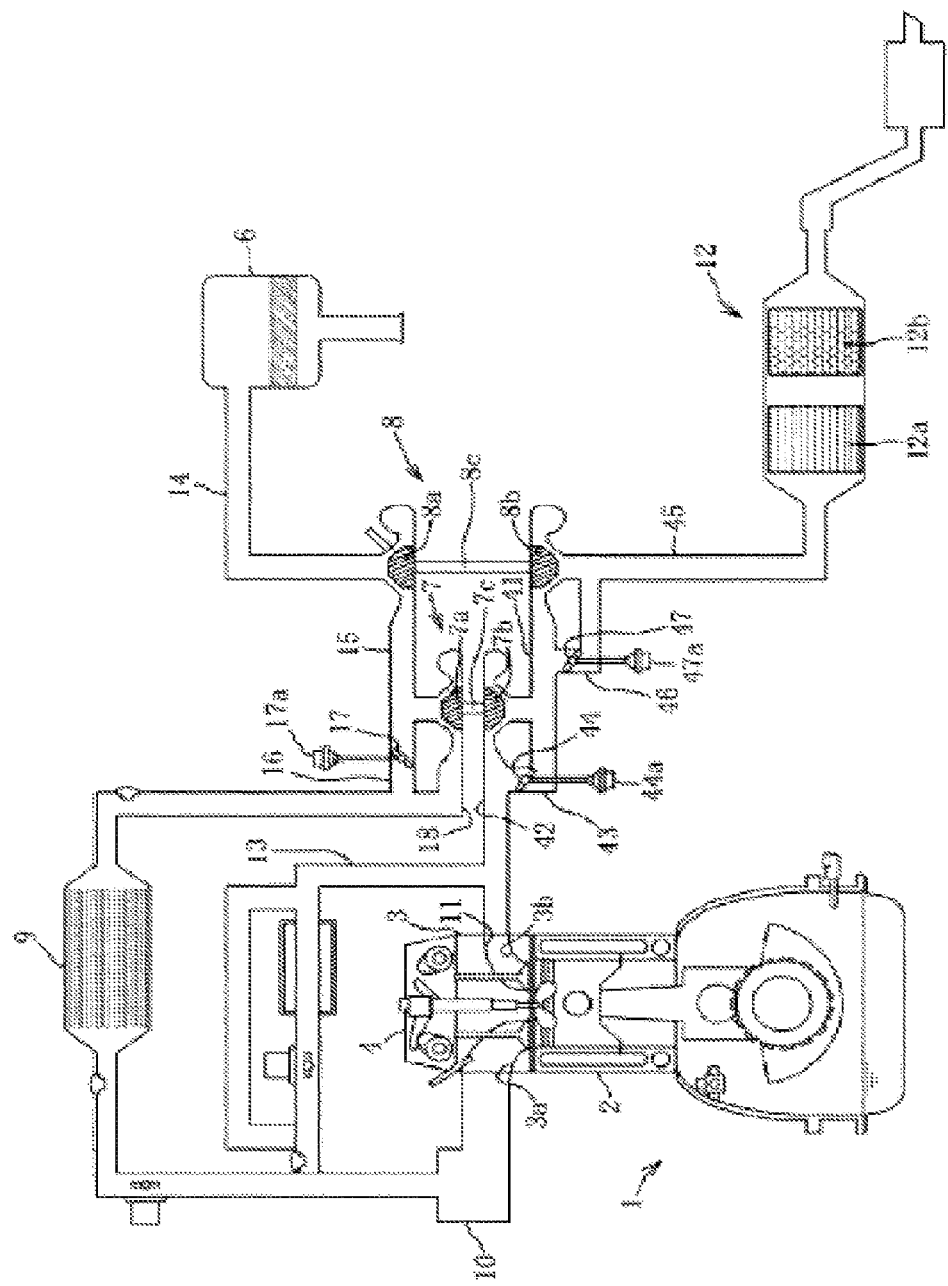
FIG. 9 is a schematic view showing flows of the intake air and the exhaust gas.

As shown in FIGS. 4 and 9, the first turbocharger 7 includes, for example, the first turbocharger compressor 7a, a first turbocharger turbine 7b, a first turbocharger turbine shaft 7c coupling the first turbocharger compressor 7a and the first turbocharger turbine 7b so that they rotate coincidently with each other, a first compressor housing 21 covering an outer circumference of the first turbocharger compressor 7a, a first turbine housing 22 covering an outer circumference of the first turbocharger turbine 7b, and a first center housing 23 rotatably supporting the first turbocharger turbine shaft 7c and covering an outer circumference of the first turbocharger turbine shaft 7c. The first center housing 23 integrally couples the first compressor housing 21 and the first turbine housing 22. As shown in FIG. 1, the first turbocharger 7 is arranged rearward of the engine 1 so that the first turbocharger turbine shaft 7c is substantially in parallel to the crank shaft of the engine 1.

The second turbocharger 8 includes, for example, the second turbocharger compressor 8a, a second turbocharger turbine 8b, a second turbocharger turbine shaft 8c coupling the second turbocharger compressor 8a and the second turbocharger turbine 8b so that they rotate coincidently with each other, a second compressor housing 31 covering an outer circumference of the second turbocharger compressor 8a, a second turbine housing 32 covering an outer circumference of the second turbocharger turbine 8b, and a second center housing 33 rotatably supporting the second turbocharger turbine shaft 8c and covering an outer circumference of the second turbocharger turbine shaft 8c. The second center housing 33 integrally couples the second compressor housing 31 and the second turbine housing 32. As shown in FIG. 1, the second turbocharger 8 is arranged right above the first turbocharger 7 and the second turbocharger turbine shaft 8c is arranged rearward of the engine 1 so as to be substantially in parallel to the crank shaft of the engine 1.

As shown in FIGS. 4 and 9, an intake air inflow passage 14 extending from the air cleaner 6 is connected with an introducing part of the second turbocharger compressor 8a. A compressor connecting passage 15 connects a discharging port of the second turbocharger compressor 8a and an introducing port of the first turbocharger compressor 7a. An intake air guide passage 16 for guiding the intake air to the intake manifold 10 via the intercooler 9 is branched from an intermediate part of the compressor connecting passage 15. An intake air cutting valve 17 is provided inside the intake air guide passage 16. The intake air cutting valve 17 serves as a swing valve and is operated by an actuator 17a. A discharging port of the first turbocharger compressor 7a is connected with a compressor downstream passage 18. The compressor downstream passage 18 is connected with the intake air guide passage 16 at a downstream position of the intake air cutting valve 17.

As shown in FIG. 4, an intake air passage unit 49 is integrally constituted with the first compressor housing 21, the second compressor housing 31, the compressor connecting passage 15, a part of the intake air guide passage 16, and a part of the compressor downstream passage 18. The intake air passage unit 49 is a molded piece formed by a metallic material with high fracture toughness, such as an aluminum alloy. Depending on quality conditions of the molded piece, a heat treatment may be omitted.

As shown in FIGS. 1 to 3 and 9, an exhaust system of the engine 1 includes, for example, an exhaust manifold 11 for guiding the exhaust gas from the exhaust ports 3b together, the first turbocharger turbine 7b of the first turbocharger 7 operated by exhaust energy, the second turbocharger turbine 8b of the second turbocharger 8 similarly operated by the exhaust energy, an exhaust emission control device 12, and an EGR pipe 13 for partially re-circulating the exhaust gas to the intake manifold 10. The exhaust manifold 11 is formed to merge the flows from the exhaust ports 3b within the cylinder head 3, and a flange 11a for connecting with the first turbocharger 7 is formed at a downstream end part of the exhaust manifold 11.

The first and second turbochargers 7 and 8 are arranged in two vertical levels in relation to the engine 1 to sandwich the flange 11a, and the discharging ports of the first and second turbocharger turbines 7b and 8b are arranged on the right side of the engine 1 in the crank shaft direction.

The first turbocharger 7 is arranged at a position on the upper left side of the cylinder block 2 and downward of the flange 11a, and the second turbocharger 8 is arranged at a position on the left side of the cylinder head cover 4 and upward of the flange 11a. The first and second turbochargers 7 and 8 are fixed to an attaching part 3g projecting from a rear side wall of the cylinder head 3 (see FIGS. 13, 15 and 16) by bolts.

As shown in FIGS. 4 and 9, the exhaust system of the engine 1 is provided with, for example, an inter-turbine passage 41 for connecting a discharging port of the first turbocharger turbine 7b with an introducing port of the second turbocharger turbine 8b, an introducing passage 42 connected with the flange 11a of the exhaust manifold 11 and for introducing the exhaust gas to an introducing port of the first turbocharger turbine 7b, a first bypass passage 43 connecting the introducing passage 42 and the inter-turbine passage 41, and a regulation valve 44 (control valve) for opening and closing the first bypass passage 43. A butterfly valve serves as the regulation valve 44 which is operated by an actuator 44a.

Figure 5:
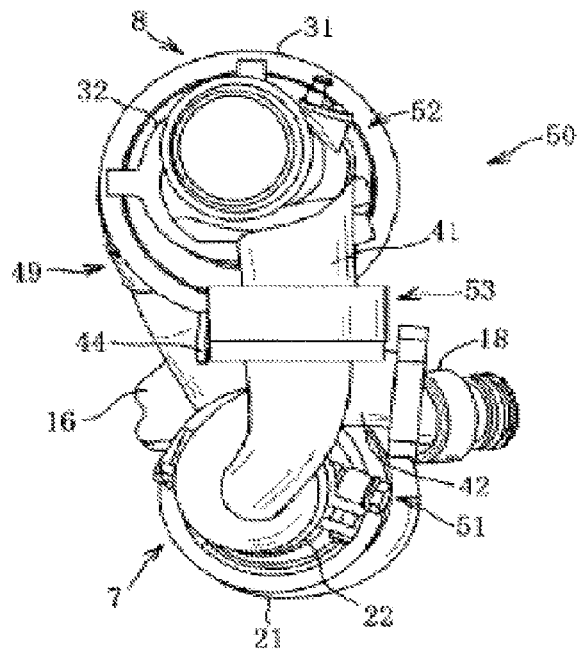
FIG. 5 is a right side view showing the intake air passage unit and the exhaust gas passage unit.
Figure 6:
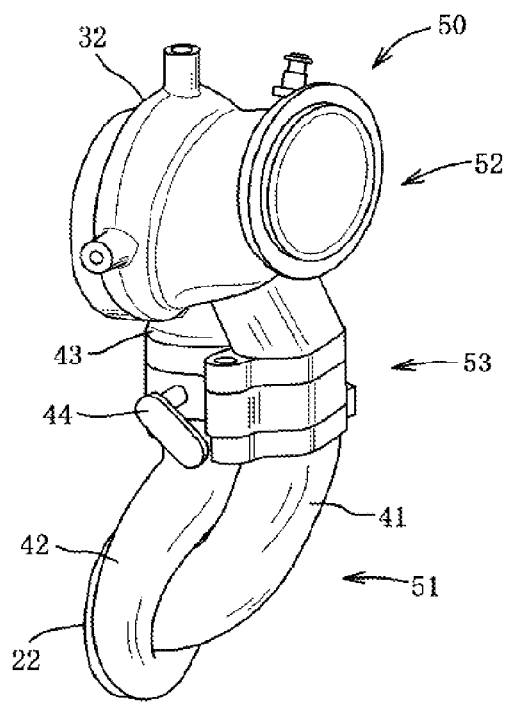
FIG. 6 is a perspective view showing the exhaust gas passage unit.

As shown in FIGS. 5 and 6, the inter-turbine passage 41 extends substantially straight from the discharging port of the first turbocharger turbine 7b (shaft center position) toward the second turbocharger 8 (upward) when viewed from a direction parallel to the shaft directions of the turbine shafts 7c and 8c, and the inter-turbine passage 41 connects with an outer circumference part of the second turbocharger turbine 8b so as to communicate in a direction tangent to the outer circumference direction of the second turbocharger turbine 8b. Thereby, the discharging port of the first turbocharger turbine 7b and the introducing port of the second turbocharger turbine 8b can be connected by a short length passage, and a thermal energy of the exhaust gas can be suppressed from being discharged outside while reducing a passage resistance of the exhaust gas.

As shown in FIGS. 4 and 6, the inter-turbine passage 41 and the first bypass passage 43 are arranged adjacent to each other in a direction parallel to the shafts of the turbine shafts 7c and 8c and are formed integrally with each other.

Figure 7:
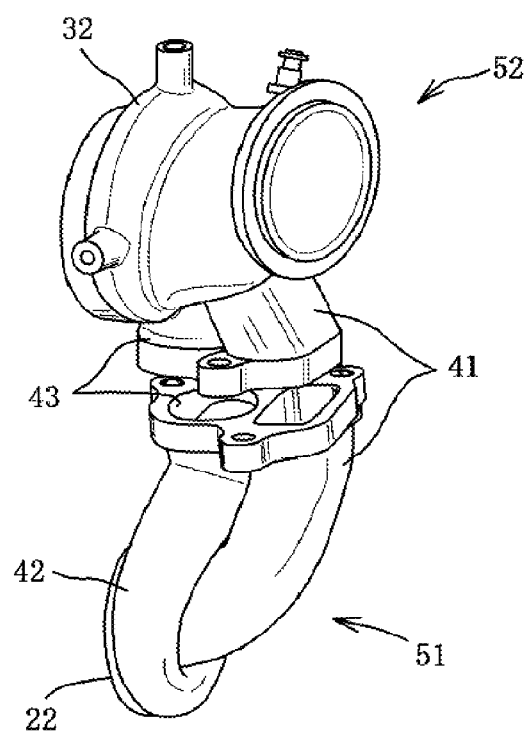
FIG. 7 is a perspective view showing a first part and a second part of the exhaust passage unit.
Figure 8:
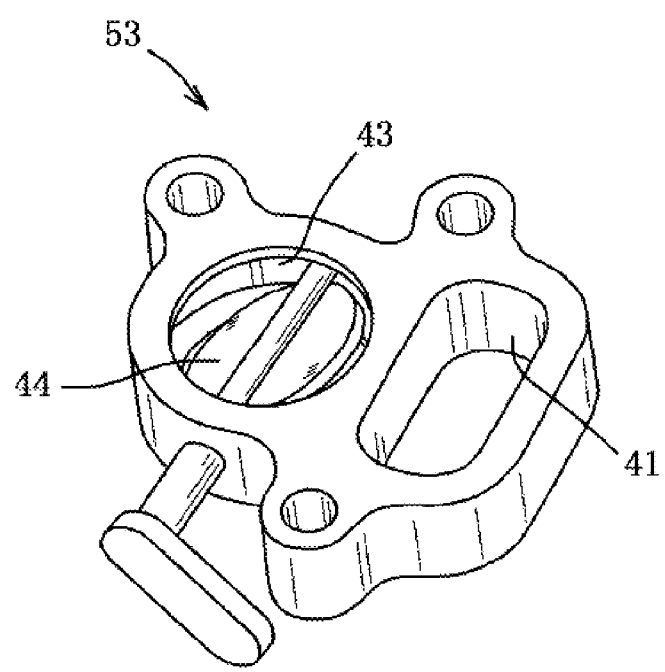
FIG. 8 is a perspective view showing an intermediate member.

As shown in FIGS. 7 and 8, a part of the inter-turbine passage 41 on the side of the second turbocharger turbine 8b has an oval shape in its cross-section, and the long axis of the cross-section is oriented substantially orthogonal to the second turbocharger turbine shaft 8c. The cross-sectional shape of the inter-turbine passage 41 is formed to have its short axis shorter near the introducing port of the second turbocharger turbine 8b than near the discharging port of the first turbocharger turbine 7b and to have the long axis longer near the introducing port of the second turbocharger turbine 8b than near the discharging port of the first turbocharger turbine 7b. Thereby, the passage resistance of the exhaust gas can be reduced and the exhaust gas can be supplied to the second turbocharger turbine 8b without reducing a kinetic energy of the exhaust gas. The first bypass passage 43 is formed in a substantially circular shape in its cross-section.

As shown in FIGS. 4 to 6, an exhaust gas passage unit 50 is integrally constituted with the first turbine housing 22, the second turbine housing 32, the inter-turbine passage 41, the first bypass passage 43, and the introducing passage 42 of the first turbocharger turbine 7b. Within the exhaust gas passage unit 50, a first part 51 is provided on the first turbocharger 7 side, a second part 52 is provided on the second turbocharger 8 side, and an intermediate member 53 is installed within a connecting part between the first and second parts 51 and 52. The exhaust gas passage unit 50 is a molded piece formed by a metallic material with low heat expansion rate and high heat and oxidation resistances, such as Si—Mo—Cr-based Fe.

As shown in FIGS. 4 to 7, the first turbine housing 22, a part of the inter-turbine passage 41 for guiding the exhaust gas from the engine 1 to the second turbocharger turbine 8b via the first turbocharger turbine 7b, the introducing passage 42 for guiding the exhaust gas from the engine 1 to the first turbocharger turbine 7b, and a part of the first bypass passage 43 for guiding the exhaust gas from the engine 1 to the second turbocharger turbine 8b are integrally formed within the first part 51. As shown in FIG. 4, a flange part 51a having four bolt holes in four corner areas is formed on the front side of the first part 51, and the intake air passage unit 49 and the exhaust passage unit 50 are attached to the attaching part 3g of the cylinder head 3 via the flange part 51a by bolts.

The turbine housing 32, another part of the inter-turbine passage 41 for guiding the exhaust gas from the engine 1 to the second turbocharger turbine 8b via the first turbocharger turbine 7b, and another part of the first bypass passage 43 for guiding the exhaust gas from the engine 1 to the second turbocharger turbine 8b are integrally formed within the second part 52.

As shown in FIG. 8, the regulation valve 44 is pivotably supported and another part of the first bypass passage 43 and another part of the inter-turbine passage 41 are formed in the intermediate member 53 installed within the connecting part of the first and second parts 51 and 52. Three bolt holes are formed within each of outer edge parts of the first and second parts 51 and 52 and the intermediate member 53, and the bolt holes are integrally fastened to be fixed as the exhaust gas passage unit 50 by bolts. A seat part for the regulation valve 44 is formed in a part of an inner circumferential surface of the first bypass passage 43 corresponding to an outer edge part of the regulation valve 44 orthogonal to a pivoting axis of the regulation valve 44. Thereby, an opening angle of the regulation valve 44 can be adjusted linearly from a fully closed state to a predetermined opening angle, for example, 80°, and an exhaust gas flowing rate inside the first bypass passage 43 can be finely adjusted by the actuator 44a.

As shown in FIGS. 1 to 3 and 9, a turbine downstream passage 45 is formed to extend rightward from the discharging port of the second turbocharger turbine 8b so as to connect with the exhaust emission control device 12. A second bypass passage 46 is formed between the introducing port of the second turbocharger turbine 8b and the turbine downstream passage 45. A wastegate valve 47 is provided inside the second bypass passage 46. The wastegate valve 47 serves as a swing valve and is operated by an actuator 47a.

The exhaust emission control device 12 is adjacently arranged at a position on the right side of the rear side wall of the engine 1, that is the right side of the first and second turbochargers 7 and 8, and is arranged vertically so that an exhaust gas inlet of the exhaust emission control device 12 is located at substantially the same height position as the discharging port of the second turbocharger turbine 8b and an exhaust gas outlet of the exhaust emission control device 12 is located downward of the first turbocharger 7. The exhaust emission control device 12 integrally accommodates an oxidation catalyst 12a and a DPF 12b (diesel particulate filter) arranged downstream from the oxidation catalyst 12a by covering them with an insulator. An upper end part of the exhaust emission control device 12 is supported by an upper bracket fixed to the cylinder head cover 4 and a lower end part of the exhaust emission control device 12 is supported by a lower bracket fixed to the cylinder block 2. Note that the DPF 12b is not limited to a filter which simply removes soot, and may be a filter carrying a catalyst.

Next, controls of the first and second turbochargers 7 and 8 are described with reference to FIGS. 9 to 11.

Figures 10, 11:
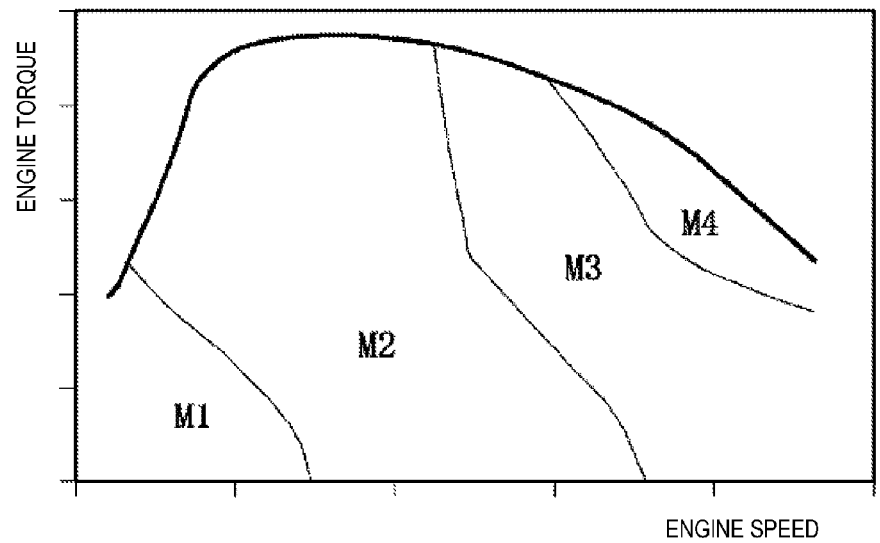
FIG. 10 is a chart showing open/close states of valves in respective operation modes.
FIG. 11 is a control map for switching among driving modes.

As shown in the control map of FIG. 10, the engine 1 is controlled in four modes, a low speed mode M1, an intermediate speed mode M2, a high intermediate speed mode M3, and a high speed mode M4, according to a traveling state of the vehicle, and the intake and exhaust in the engine 1 are controlled in the five operation modes M0 to M4 (added a starting mode M0). A control unit (not illustrated) of the engine 1 determines an operation mode among the modes M0 to M4 based on values detected by the in-vehicle sensors, and controls the intake air cutting valve 17, the regulation valve 44, and the wastegate valve 47 as shown in the chart in FIG. 11.

In the starting mode M0 when the engine is started, the intake air cutting valve 17 is closed and the regulation valve 44 and the wastegate valve 47 are opened.

As shown in FIG. 9, the exhaust gas of the engine 1 passes through the exhaust ports 3b and the exhaust manifold 11 and is guided to the introducing passage 42. Here, the exhaust gas further passes through the first bypass passage 43 and bypasses the first turbocharger turbine 7b because the regulation valve 44 is opened. The exhaust gas which bypassed the first turbocharger turbine 7b further bypasses the second turbocharger turbine 8b to be introduced into the exhaust emission control device 12 because the wastegate valve 47 is opened. Thereby, the exhaust gas with a small kinetic energy loss and high temperature can be introduced into the exhaust emission control device 12. Note that, the intake air is not turbo-charged because the first and the second turbocharger compressors 7a and 8a are not in operation.

In the low speed mode M1, the intake air cutting valve 17, the regulation valve 44, and the wastegate valve 47 are closed. Here, the exhaust gas of the engine 1 rotates the first and second turbocharger turbines 7b and 8b and is further introduced into the exhaust emission control device 12 because the regulation valve 44 is closed. Therefore, the intake air turbo-charged by the first and second turbocharger compressors 7a and 8a is supplied to the intake ports 3a. Thereby, even when the kinetic energy of the exhaust gas is small under the low speed, a turbo-charging effect can be obtained.

In the intermediate speed M2, the intake air cutting valve 17 and the wastegate valve 47 are closed, and the regulation valve 44 is adjusted in its opening angle. The opening angle of the regulation valve 44 is controlled to be larger as the engine speed is higher and/or the engine torque is higher.

Here, a part of the exhaust gas rotates the first and second turbocharger turbines 7b and 8b, and the rest of the exhaust gas bypasses the first and second turbocharger turbines 7b and 8b and is introduced into the exhaust emission control device 12 because the angle of the regulation valve 44 is controlled according to the operation state of the engine. Therefore, the intake air turbo-charged by the first and second turbocharger compressors 7a and 8a is supplied to the intake ports 3a. Thereby, both the efficient turbo-charging and the reduction of the exhaust resistance of the first turbocharger compressor 7a can be achieved.

In the high intermediate speed mode M3, the intake air cutting valve 17 and the regulation valve 44 are opened, and the wastegate valve 47 is closed.

The exhaust gas of the engine 1 bypasses the first turbocharger turbine 7b, passes through the first bypass passage 43 and rotates the second turbocharger turbine 8b, and further is introduced into the exhaust emission control device 12. The intake air turbo-charged by the second turbocharger compressor 8a is supplied to the intake ports 3a.

In the high speed mode M4, the intake air cutting valve 17 and the regulation valve 44 are opened, and the wastegate valve 47 is adjusted in its opening timing. The wastegate valve 47 is opened when the engine speed is higher than a predetermined value and/or when the engine torque is larger than a predetermined value.

A part of the exhaust gas which bypassed the first turbocharger turbine 7b rotates the second turbocharger turbine 8b, and the rest of the exhaust gas bypasses the second turbocharger turbine 8b and is introduced into the exhaust emission control device 12 because the wastegate valve 47 is controlled in its opening timing according to the operation state of the engine. Therefore, the intake air turbo-charged by the second turbocharger compressor 8a is supplied to the intake ports 3a. Thereby, the intake and exhaust resistances can be reduced while securing the turbo-charging efficiency of the second turbocharger compressor 8a.

Next, a lubrication device of this embodiment is described in detail with reference to FIGS. 1 and 12 to 14.

Figure 13:
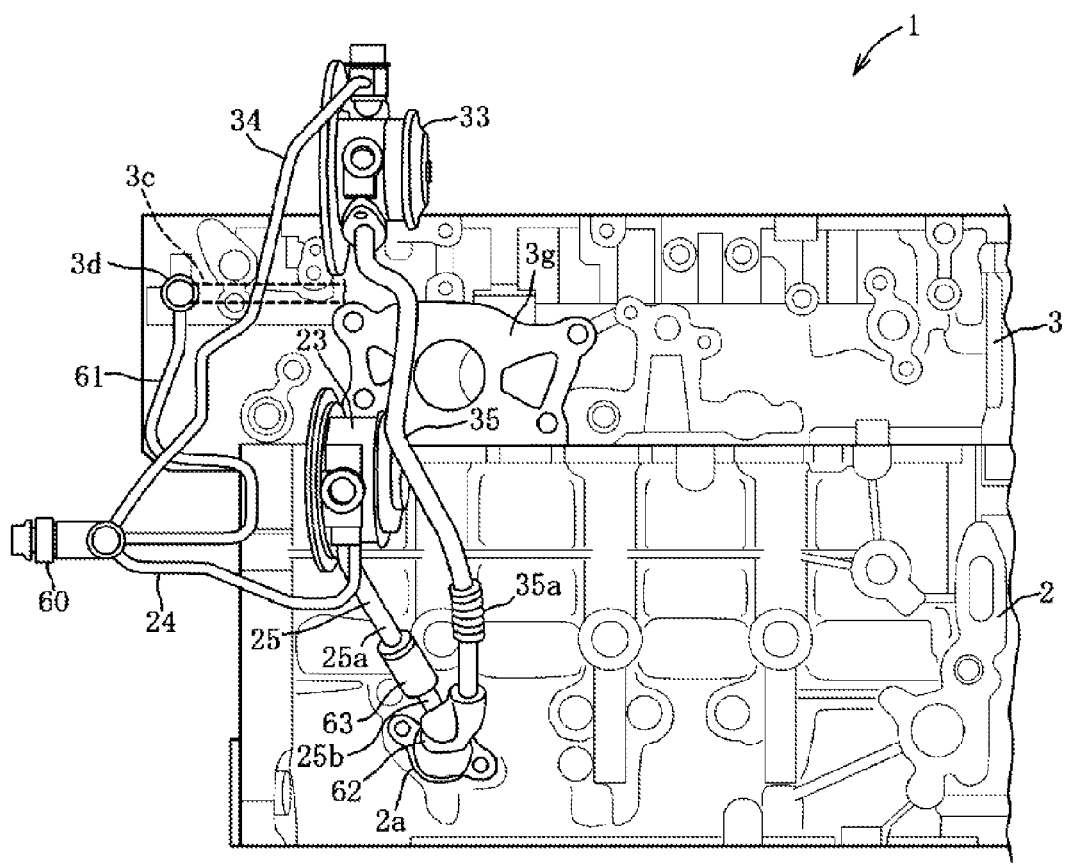
FIG. 13 is an elevational view showing the lubricating oil passage as seen from the vehicle rear side.
Figure 14:
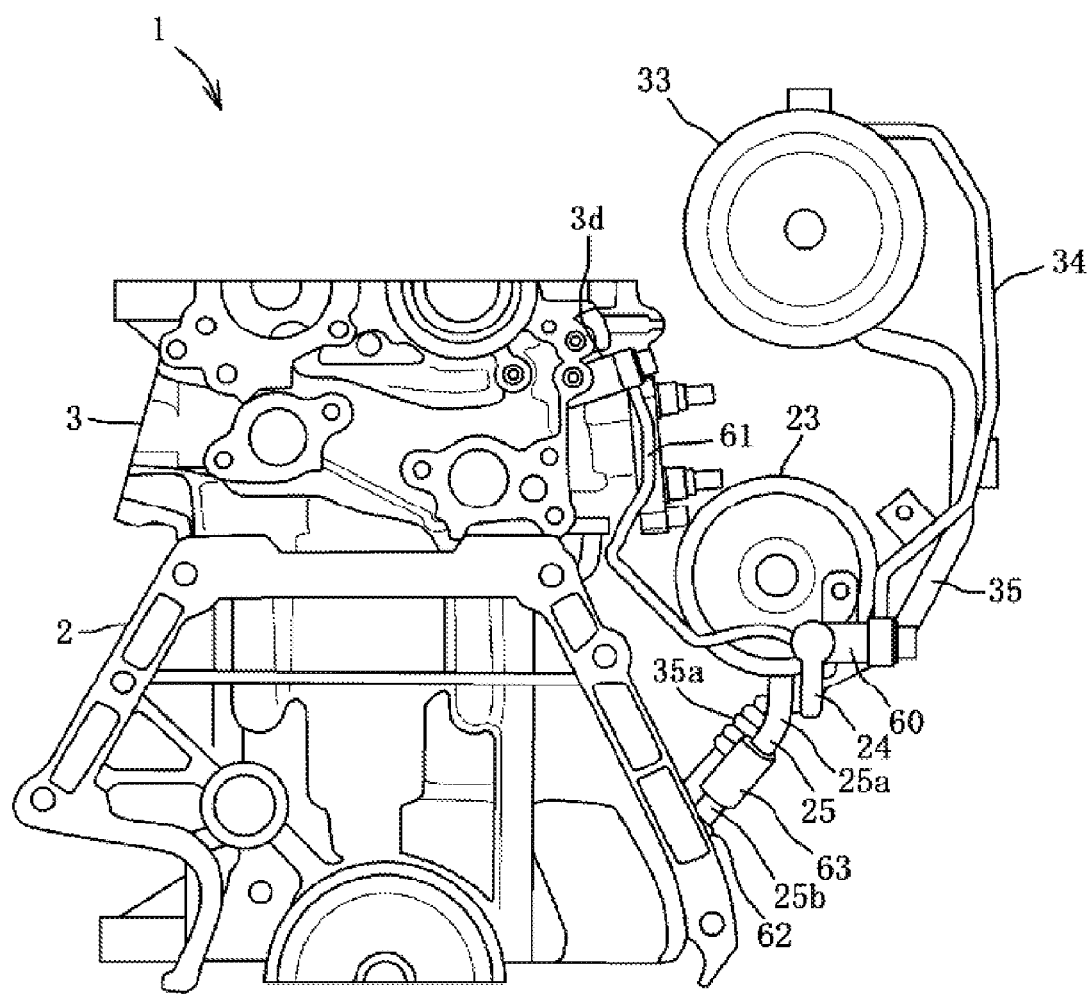
FIG. 14 is a left side view showing the lubricating oil passage.
Figure 15:
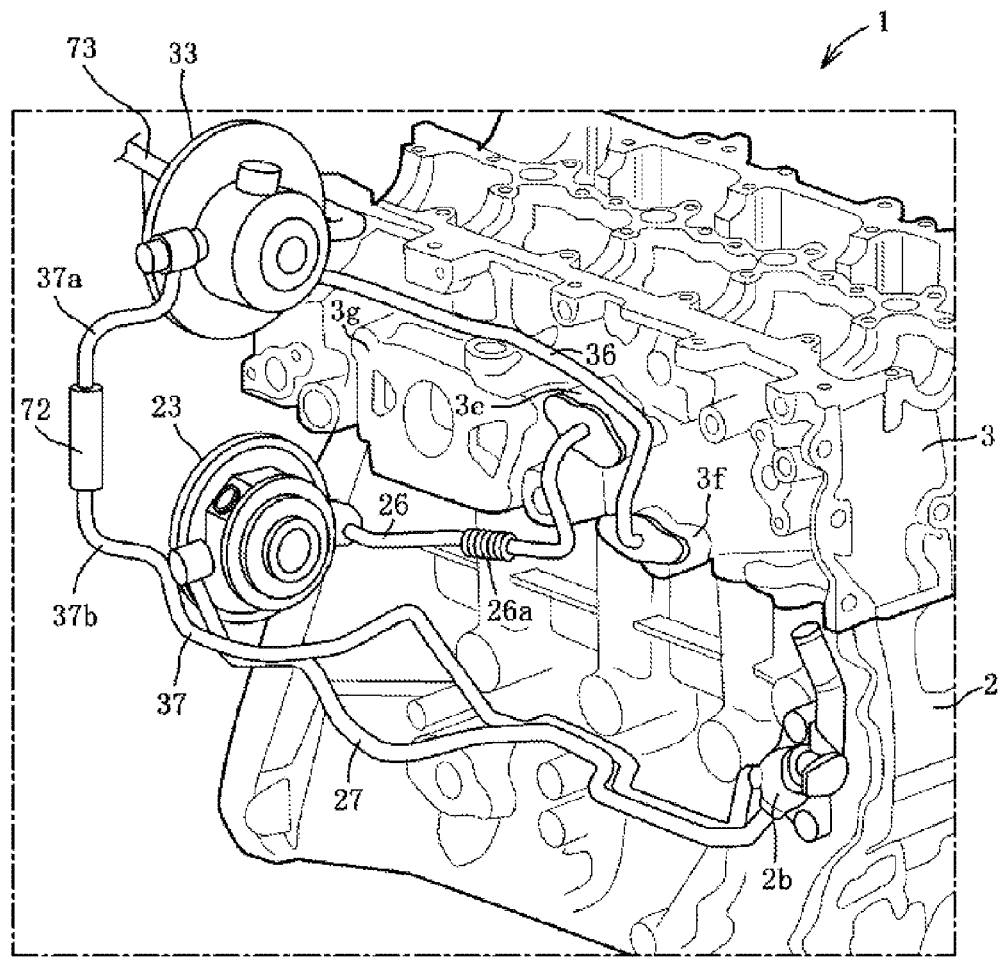
FIG. 15 is a perspective view showing a cooling fluid passage according to the embodiment.
Figure 16:
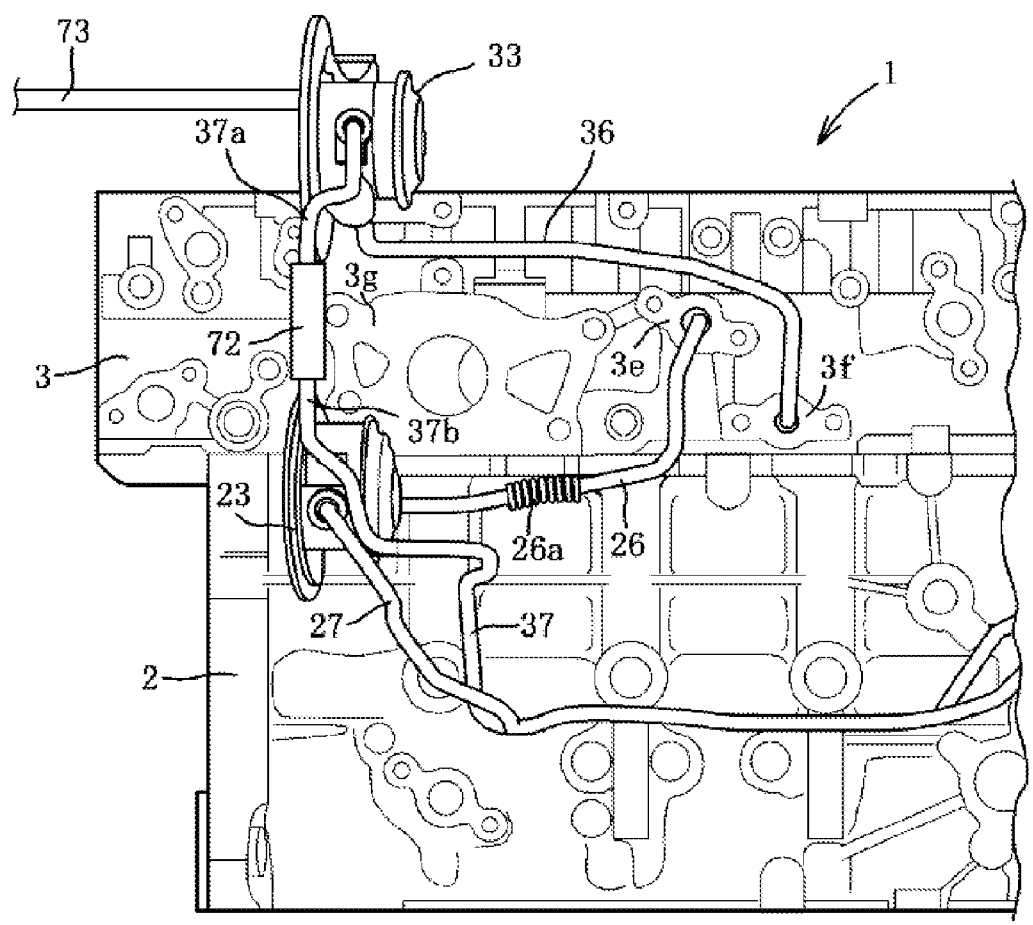
FIG. 16 is an elevational view showing the cooling fluid passage as seen from the vehicle rear side.
Figure 17:
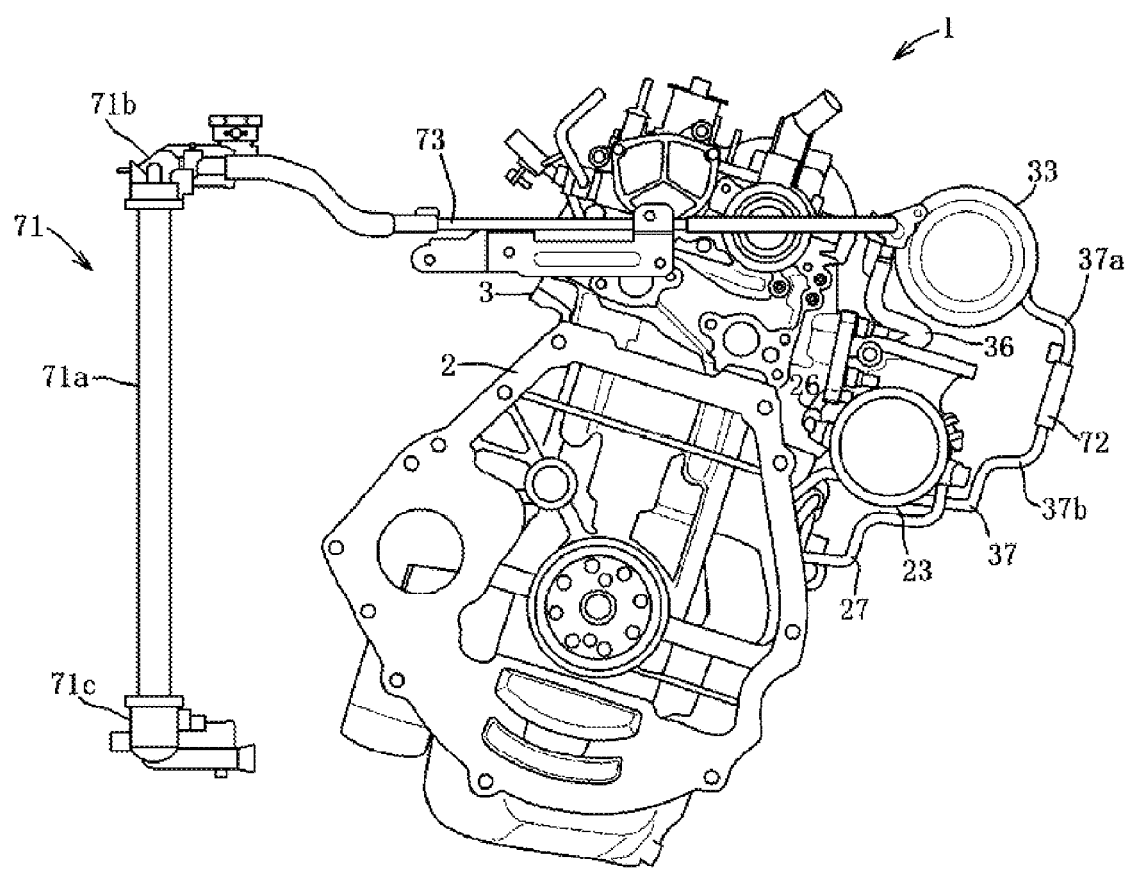
FIG. 17 is a left side view showing the cooling fluid passage.

As shown in FIG. 13, an oil gallery 3c extending along the right-and-left axis is formed inside the cylinder head 3. A lubricant of the engine 1 is supplied from an oil pump (not illustrated) provided to the cylinder block 2 to lubrication sections via oil passages. The lubricant supplied from the oil pump to the cylinder head 3 is further supplied from the oil gallery 3c to, for example, cam shaft bearings.

An oil storage (not illustrated) for storing the lubricant between the first turbocharger turbine shaft 7c and a bearing part is formed inside the first center housing 23 of the first turbocharger 7. Further, similar to the first center housing 23, an oil storage (not illustrated) for storing the lubricant between the second turbocharger turbine shaft 8c and a bearing part is formed inside the second center housing 33 of the second turbocharger 8. The lubricant for the first and second turbocharger turbine shafts is supplied from the cylinder head 3 to the first and second center housings 23 and 33 via an oil distributor 60, and the used lubricant is guided to an oil re-circulation part 2a formed at a left middle position of the rear side wall of the cylinder block 2.

The oil distributor 60 is arranged leftward and rearward of an upper left end part of the cylinder block 2. The oil distributor 60 is connected with an oil receiving part 3d communicating with a left end part of the oil gallery 3c of the cylinder head 3 by an oil supply passage 61. The metallic oil supply passage 61 extends downward from the oil receiving part 3d and is curved rearward and leftward to be connected with the oil distributor 60. Thereby, the oil receiving part 3d serving as a connecting part on the engine side can be reduced in number to be less than the number of oil supply passages of the first and second turbochargers 7 and 8.

A first center housing 23 is formed with, for example, a first supply passage 24 for guiding the lubricant from the oil distributor 60 and a first return passage 25 for discharging the lubricant from the first center housing 23. The second center housing 33 is formed with, for example, a second supply passage 34 for guiding the lubricant from the oil distributor 60 and a second return passage 35 for discharging the lubricant.

As shown in FIG. 1, the first return passage 25 and the second return passage 35 are arranged on the left side of the exhaust emission control device 12.

Figure 12:
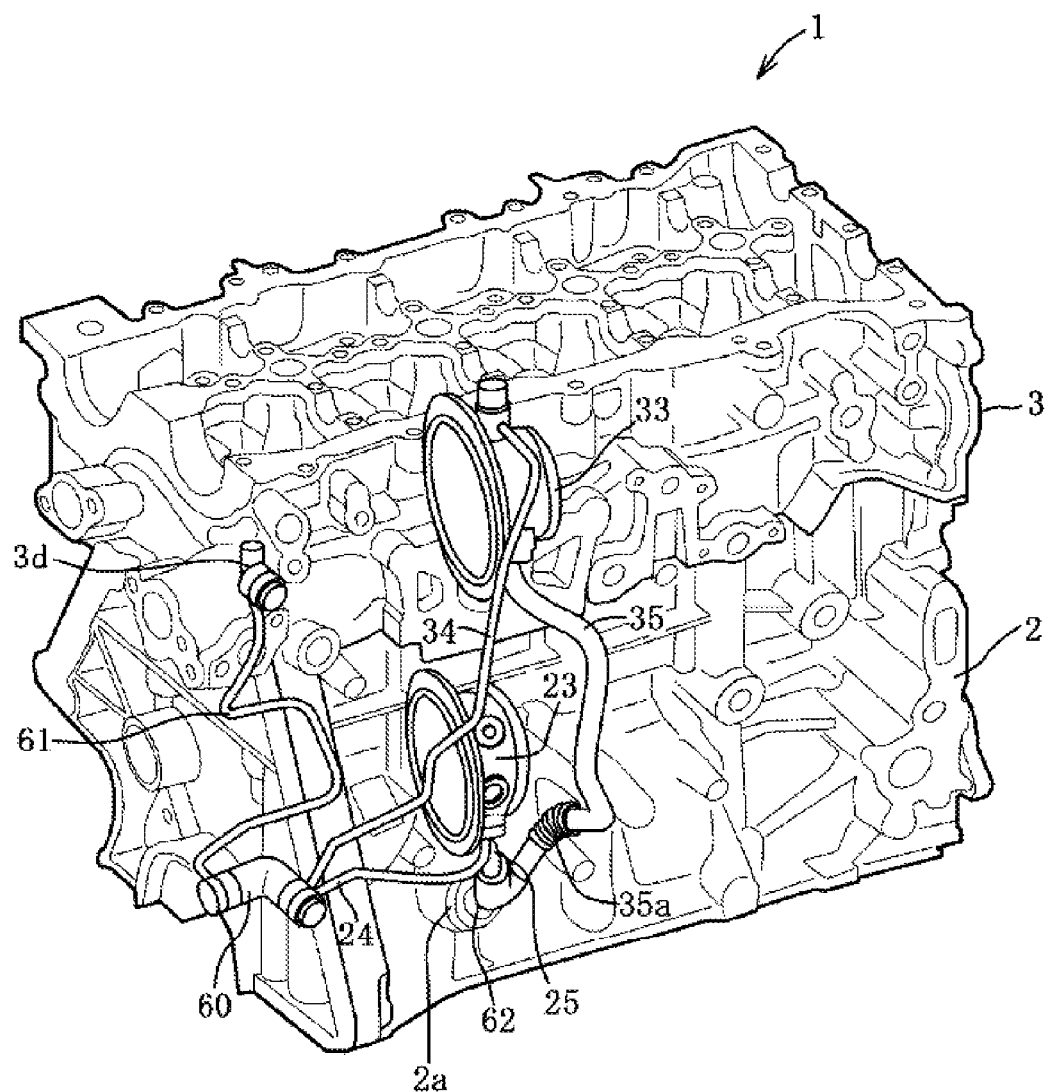
FIG. 12 is a perspective view showing a lubricating oil passage according to the embodiment.

As shown in FIGS. 12 and 13, the first supply passage 24, which is a metallic pipe, extends rightward along the first turbocharger turbine shaft 7c from the oil distributor 60 and curves upward to be connected with a lower surface of the first center housing 23. The first return passage 25, which is a metallic pipe, is formed to have a diameter larger than that of the first supply passage 24 in its cross-section and is divided at a midstream part into a first upstream return passage 25a on the first center housing 23 side and a first downstream return passage 25b on the oil re-circulation part 2a side.

An upper end part of the first upstream return passage 25a is connected with the lower surface of the first center housing 23 and extends obliquely downward and forward from the lower surface. A lower end part of the first downstream return passage 25b is connected with a merging part 62 (described later) so as to merge with the second return passage 35.

The lower end part of the first upstream return passage 25a and the upper end part of the first downstream passage 25b are connected with a flexible hose 63 made of heat resistant synthetic rubber. Thereby, even if positions of the lower end part of the first upstream return passage 25a and the upper end part of the first downstream return passage 25b offset from each other, the position difference can be absorbed by the flexible hose 63. Further, because the flexible hose 63 can be shortened as a result of shortening of the first return passage 25, a surface area of the flexible hose to be exposed to a high temperature heat can be minimized, a vibration displacement between the first turbocharger 7 and the engine 1 can be suppressed while suppressing damages on the flexible hose 63 due to the heat, and an offset in position of the first and second turbochargers 7 and 8 can be absorbed.

The second supply passage 34, which is a metallic pipe, extends rightward along the second turbocharger turbine shaft 8c and upward from the oil distributor 60 and curves forward to connect with an upper surface of the second center housing 33. The second return passage 35, which is a metallic pipe, is formed to have a diameter larger than the second supply passage 34 and is arranged between the first return passage 25 and the exhaust emission control device 12. The second return passage 35 extends downward from a lower surface of the second center housing 33, and a lower end part of the second return passage 35 is connected with the oil re-circulation part 2a. A bellows-shaped vibration absorbing part 35a is formed in a lower part of the second return passage 35. Thereby, even if the entire second return passage 35 is formed by a metal with high heat resistance, the vibration displacement generated as a result of a difference between natural vibrations of the second turbocharger 8 and the engine 1 can be absorbed by the bellows-shaped vibration absorbing part 35a.

The metallic merging part 62 for merging with the first downstream return passage 25b is formed at a lower end part of the second return passage 35, and a lower end part of the merging part 62 is coupled to the oil re-circulation part 2a.

A passage length of the second return passage 35 between the second center housing 33 and the merging part 62 is longer than a passage length of the first return passage 25 between the first center housing 23 and the merging part 62. Here, the passage length of the first return passage 25 is the combined passage length of the first upstream return passage 25a, the first downstream return passage 25b, and the flexible hose 63. Thereby, the oil re-circulation part 2a can be reduced in number to be less than the number of the first and second return passages 25 and 35 of the first and second turbochargers 7 and 8, the first and second return passages 25 and 35 can be connected with the engine side wall within a small space, and the degree of layout freedom near the engine 1 can be increased. In addition, only the second return passage 35 is connected with the engine side wall, therefore, an attaching position deviation of the second return passage 35 can be minimized without an offset in the position of the first turbocharger 7 from the engine 1 affecting the connection of the second return passage 35.

Next, a cooling device according to the embodiment is described in detail with reference to FIGS. 15 to 18.

Figure 18:
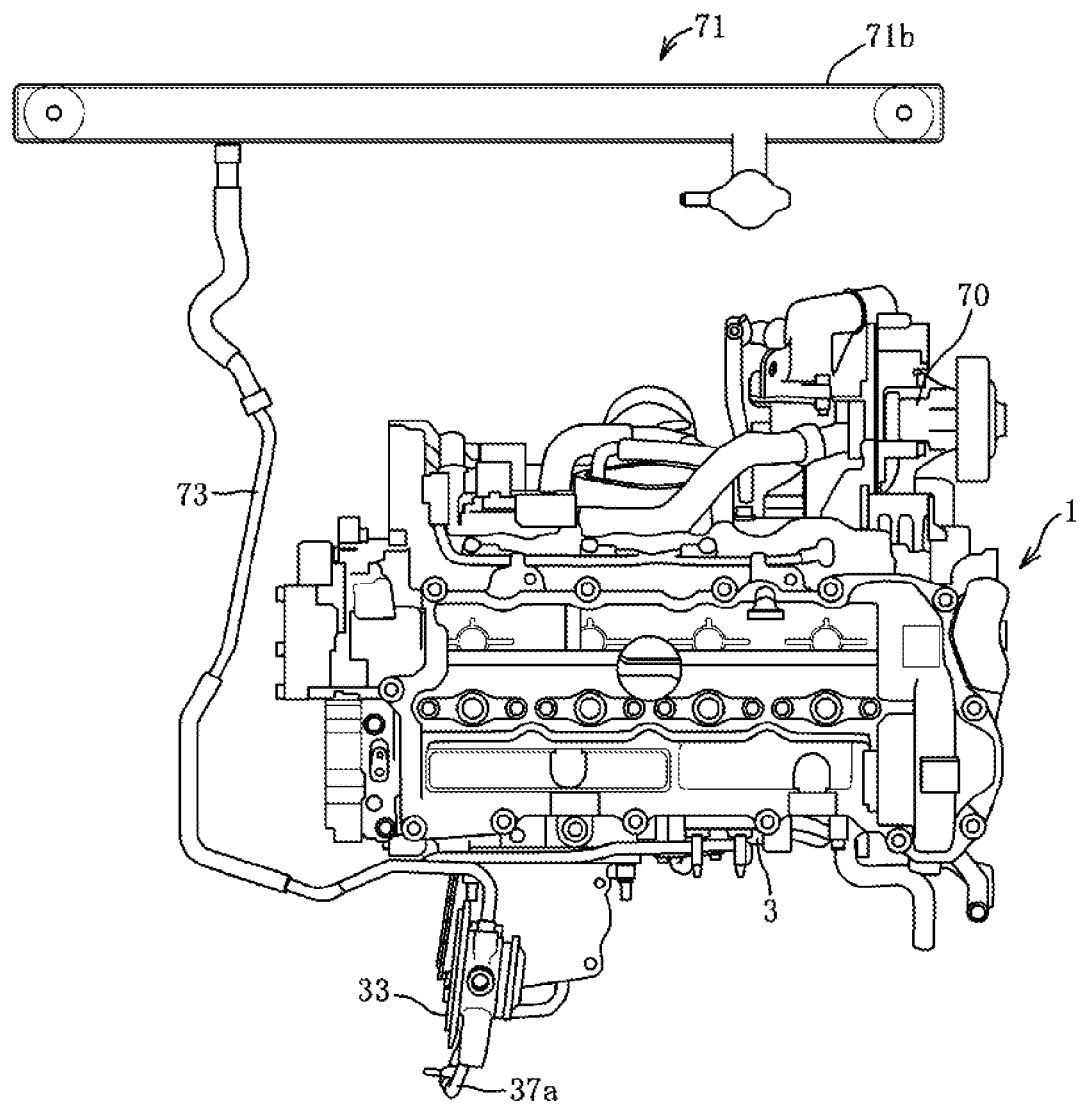
FIG. 18 is a plan view showing the cooling fluid passage as seen from above.

As shown in FIG. 18, cooling fluid of the engine 1 is supplied from a water pump 70 provided to a front side wall of the cylinder block 2 to sections which are needed to be cooled via cooling fluid passages. The cooling fluid supplied from the water pump 70 to the cylinder head 3 via the cylinder block 2 circulates within water jackets (not illustrated) formed inside the cylinder head 3 so as to cool the cooling required sections. The cooling fluid with higher temperature due to the cooling is guided to a radiator 71 arranged forward of the engine 1 so that the fluid temperature is decreased by exchanging heat with the traveling wind, and is further re-circulated to the water pump 70.

The radiator 71 includes, for example, a core 71a formed with a plurality of radiation fins in a longitudinal path where the cooling fluid flows, an upper tank 71b provided on the upper side of the core 71a, and a lower tank 71c provided on the lower side of the core 71a. The cylinder head 3 and the upper tank 71b are connected with each other by a suction passage (not illustrated), and the lower tank 71c and a cooling fluid introducing part (not illustrated) of the water pump 70 provided on its suction side are connected with each other by a delivery passage (not illustrated). The upper tank 71b is arranged at a position higher than the second center housing 33 of the second turbocharger 8. A thermostat (not illustrated) for controlling the flow of the cooling fluid corresponding to the fluid temperature is provided to the cooling fluid introducing part.

A cooling fluid storage (not illustrated) for storing the cooling fluid at the bearing part of the first turbocharger turbine shaft 7c is formed inside the first center housing 23 of the first turbocharger 7. Further, similar to the first center housing 23 a cooling fluid storage (not illustrated) for storing the cooling fluid at a bearing part of the second turbocharger turbine shaft 8c is formed inside the second center housing 33 of the second turbocharger 8. The cooling fluid for cooling the first and second turbocharger turbine shafts 7c and 8c is supplied from the cylinder head 3 to the first and second center housings 23 and 33, and the cooling fluid after the cooling is guided to a cooling fluid re-circulation part 2b formed at a right middle position of the rear side wall of the cylinder block 2. A heater return pipe is connected with the cooling fluid re-circulation part 2b, and the cooling fluid for the first and second turbocharger turbine shafts 7c and 8c is merged inside the cooling fluid re-circulation part 2b with the cooling fluid returned from a heater (not illustrated). The cooling fluid re-circulation part 2b is communicated with the cooling fluid introducing part of the water pump 70 on its suction side.

The first center housing 23 is formed with, for example, a first water supply passage 26 for introducing the cooling fluid from the cylinder head 3 and a first return passage 27 for discharging the cooling fluid. The second center housing 33 is provided with, for example, a second water supply passage 36 for introducing the cooling fluid from the cylinder head 3, a second return passage 37 for discharging the cooling fluid, and a steam returning passage 73.

The first water supply passage 26, which is a metallic pipe, connects a middle part of a front surface of the first center housing 23 opposing the rear side wall of the cylinder block 2 with a cooling fluid connecting part 3e (connecting part on the engine body side) in fluid communication with the water jacket of the cylinder head 3. The cooling fluid connecting part 3e is provided substantially at the center of the engine 1 in the crank shaft direction and a middle position of the cylinder head 3 in a vertical direction. The first water supply passage 26 extends downward from the cooling fluid connecting part 3e and further extends leftward and rearward to reach the first center housing 23. As above, when the engine 1 is stopped after a high load operation, a steam generated inside the first center housing 23 passes through the first water supply passage 26 so as to be discharged to the water jacket of the cylinder head 3, and cooling fluid is newly supplied to the first center housing 23.

A bellows-shaped vibration absorbing part 26a extending along the right-and-left axis is formed in a midstream part of the first water supply passage 26. Thereby, an attaching position deviation between the first turbocharger 7 and the engine 1 can easily be absorbed and the vibration displacement generated as a result of a difference between natural vibrations of the first turbocharger 7 and the engine 1 can be absorbed.

The first return passage 27, which is a metallic pipe, connects a middle part of a rear surface of the first center housing 23 with the cooling fluid re-circulation part 2b. The first return passage 27 extends rightward and downward from a rear surface of the first center housing 23 to reach the cooling fluid re-circulation part 2b. Thereby, the degree of layout freedom of the first return passage 27 increases and the steam from the first turbocharger 7 can be made certain to be released to the engine 1 body side.

The second water supply passage 36, which is a metallic pipe, connects a middle part of a front surface of the second center housing 33 opposing a rear side wall of the cylinder head cover 4 with a cooling fluid connecting part 3f (connecting part on the engine body side) in fluid communication with the water jacket of the cylinder head 3. The cooling fluid connecting part 3f is provided rightward and downward of the cooling fluid connecting part 3e. The second water supply passage 36 extends upward from the cooling fluid connecting part 3f and further extends leftward and rearward to reach the second center housing 33.

The second return passage 37, which is a metallic pipe, connects a middle part of a rear surface of the second center housing 33 and the cooling fluid re-circulation part 2b. The second return passage 37 is divided at a midstream part into a second upstream return passage 37a on the second center housing 33 side and a second downstream return passage 37b on the cooling fluid re-circulation part 2b side. An upper end part of the second upstream return passage 37a is connected with a middle part of a rear surface of the second center housing 33, and the second upstream return passage 37a extends rearward and downward in a crank-shape from the middle part of the rear surface of the second center housing 33. The second downstream return passage 37b extends rightward and downward to reach the cooling fluid re-circulation part 2b. A lower end part of the second upstream return passage 37a and an upper end part of the second downstream return passage 37b are connected with a flexible hose 72 made of heat resistant synthetic resin extending along the up-and-down axis. Therefore, an attaching position deviation of the second turbocharger 8 and the engine 1 can easily be absorbed and a vibration displacement generated as a result of a difference between operation vibrations of the second turbocharger 8 and the engine 1 can be absorbed.

The steam returning passage 73 connects an upper part of the cooling fluid storage of the second turbocharger turbine shaft 8c with a part of the upper tank 71b on its suction side. The connecting position between the steam returning passage 73 and the second center housing 33 is arranged at higher than the connecting position between the second center housing 33 and the second water supply passage 36 and the connecting position between the second center housing 33 and the second return passage 37. As above, when the engine 1 is stopped after the high load operation, the steam generated inside the second center housing 33 passes through the steam returning passage 73 and is discharged to the suction part of the upper tank 71b, and cooling fluid is newly supplied from the second water supply passage 36 to the second center housing 33.

Next, functions and effects of the turbo-charging apparatus of the vehicle engine according to the first embodiment are described in detail.

The turbo-supercharging apparatus of the vehicle engine 1 includes the first turbocharger 7, the second turbocharger 8, the inter-turbine passage 41 connecting the discharging port of the first turbocharger turbine 7b with the introducing port of the second turbocharger turbine 8b, the first bypass passage 43 connecting the introducing passage 42 of the first turbocharger turbine 7b and the inter-turbine passage 41, and the regulation valve 44 for opening and closing the first bypass passage 43. The first turbocharger turbine shaft 7c and the second turbocharger turbine shaft 8c are arranged substantially in parallel to each other. The inter-turbine passage 41 extends substantially straight from the discharging port of the first turbocharger turbine 7b toward the second turbocharger 8 when viewed from the direction parallel to the first and second turbocharger turbine shafts so that the inter-turbine passage connects with the outer circumferential part of the second turbocharger turbine 8b so as to connect in the direction tangent to the outer circumference direction of the second turbocharger turbine 8b. The inter-turbine passage 41 and the first bypass passage 43 are arranged adjacent to each other in a direction parallel to the shafts of the first turbocharger turbine shaft 7c and the second turbocharger turbine shaft 8c and formed integrally with each other.

In the turbo-charging apparatus of the vehicle engine 1, the first turbocharger turbine shaft 7c and the second turbocharger turbine shaft 8c are arranged substantially in parallel to each other, and the inter-turbine passage 41 extends substantially straight from the discharging port of the first turbocharger turbine 7b toward the second turbocharger 8 when viewed from the direction parallel to the first and second turbocharger turbine shaft directions. Therefore, the discharging port of the first turbocharger turbine 7b and the introducing port of the second turbocharger turbine 8b can be connected by the passage with a short length, and the thermal energy of the exhaust gas to be discharged outside can be suppressed. Thus, the turbo-charging efficiency of the second turbocharger 8 can be improved, and, when the DPF 12b and the catalyst 12a are equipped in the downstream of the turbo-charging apparatus, a regeneration efficiency of the DPF 12b can be improved and the catalyst 12a can be activated earlier. Further, the inter-turbine passage 41 is connected with the outer circumferential part of the second turbocharger turbine 8b so as to connect in the direction tangent to the outer circumference direction of the second turbocharger turbine 8b, and the inter-turbine passage 41 and the first bypass passage 43 are arranged adjacent to each other in the direction parallel to the shafts of the first turbocharger turbine shaft 7c and the second turbocharger turbine shaft 8c and formed integrally with each other. Therefore, a performance of introducing the exhaust gas into the second turbocharger turbine 8b can be maintained high, a compact layout of the components near the engine 1 can be achieved by shortening the passage length between the first turbocharger 7 and the second turbocharger 8, and thereby, reduction in weight and manufacturing cost can be achieved.

Further, the exhaust gas passage unit 50 is integrally constituted with the inter-turbine passage 41, the first bypass passage 43, and the introducing passage 42 of the first turbocharger turbine 7b. The exhaust gas passage unit 50 includes the first part 51 on the first turbocharger 7 side and the second part 52 on the second turbocharger 8 side. The introducing passage 42 for guiding the exhaust gas from the engine 1 to the first turbocharger turbine 7b, the inter-turbine passage 41 for guiding the exhaust gas from the engine 1 to the second turbocharger turbine 8b, and the part of the first bypass passage 43 are formed within the first part 51. Thereby, the passages between the first turbocharger 7 and the second turbocharger 8 can be unitized, the first and second turbochargers 7 and 8 can easily be supported by the engine 1, and the maintenance efficiency can be improved.

Further, the first turbocharger turbine 7b is arranged below the second turbocharger turbine 8b. Therefore, the first turbocharger 7 and the second turbocharger 8 can be arranged vertically along the rear side wall of the engine 1, and thus the supporting strength of the first and second turbochargers 7 and 8 by the engine 1 can be increased while the layout efficiency near the engine 1 is maintained.

Further, the regulation valve 44 is provided within the connecting part between the first part 51 and the second part 52. Therefore, the attaching efficiency of the regulation valve 44 by the exhaust gas passage unit 50 and the maintenance ability of the regulation valve 44 can be secured.

Further, a butterfly valve serves as the regulation valve 44. Therefore, the opening angle of the regulation valve 44 can finely be adjusted and the turbo-charging adjustment can accurately be controlled.

Further, within the connecting part of the first part 51 and the second part 52, the first part 51 and the second part 52 are coupled to each other via the intermediate member 53, and the intermediate member 53 is formed with the part of the first bypass passage 43 arranged with the regulation valve 44 and the part of the inter-turbine passage 41. Therefore, the attaching efficiency of the regulation valve 44 by the exhaust gas passage unit 50 and the maintenance ability of the regulation valve 44 can be secured with the simple configuration.

Further, the part of the inter-turbine passage 41 on the side of the second turbocharger turbine 8b has an oval shape in its cross-section, and the long axis of the cross-section is oriented substantially orthogonal to the second turbocharger turbine shaft 8c. Therefore, the efficiency of introducing the exhaust gas to the second turbocharger turbine 8b can be improved.

Next, modified embodiments in which the embodiment described above is partially changed are described. (1) In the above embodiment, the example of the transversely arranged diesel engine with respect to the vehicle is described. However, the present invention may be applied regardless of the arrangement and the kind of the engine, and may be applied to a longitudinally arranged reciprocating engine.

(2) In the above embodiment, the example of the turbochargers arranged in the two vertical levels where the first turbocharger with the smaller capacity is arranged on the lower side and the second turbocharger with the larger capacity is arranged on the upper side is described. However, it is not limited to this as long as the first and second turbochargers are connected in series at least, and the first turbocharger with smaller capacity may be arranged on the upper side and the second turbocharger with larger capacity may be arranged on the lower side, or the first and second turbochargers may be arranged side by side laterally.

(3) In the above embodiment, the example that the inter-turbine passage is shortened to suppress the thermal energy to be discharged is described. However, a so called exhaust gas temperature raising technique that lifts the exhaust valves by a predetermined amount when the intake valves are lifted by utilizing a valve system in which the exhaust valve is opened twice may be combined, thereby the exhaust gas temperature can further be raised, and the turbo-charging efficiency and the regeneration efficiency of the DPF can be improved and the catalyst can be activated earlier.

(4) Further, the present invention may be implemented in other various modified embodiments that can be performed by those skilled in the art by applying various changes to the above embodiment in a range of not deviating from the spirit and scope of the invention.

According to the present invention, in the turbo-charging apparatus of the vehicle engine including the first turbocharger and the second turbocharger arranged in series with the first turbocharger, by integrally forming the inter-turbine passage and the first bypass passage 43 between the first and second turbochargers so as to be adjacent to each other in the direction parallel to the turbine shafts, the thermal energy of the exhaust gas to be discharged outside can be suppressed, and the compact layout of the components near the engine can be achieved while maintaining the performance of introducing the exhaust gas into the second turbocharger turbine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A turbo-charging apparatus for a vehicle engine, comprising:
   a first turbocharger;
   a second turbocharger configured to receive exhaust gas from a turbine of the first turbocharger;
   an inter-turbine passage connecting in an exhaust flow direction a discharging port of the turbine of the first turbocharger with an introducing port of a turbine of the second turbocharger, wherein the inter-turbine passage is configured to allow exhaust gas discharged from the discharging port of the turbine of the first turbocharger to flow to the introducing port of the turbine of the second turbocharger;
   a bypass passage connecting an introducing passage of the turbine of the first turbocharger with the inter-turbine passage, wherein the introducing passage connects to an exhaust manifold of the engine and can introduce exhaust gas to the introducing port of the turbine of the second turbocharger and wherein the bypass passage allows exhaust gas to bypass the turbine of the first turbocharger; and
   a control valve for opening and closing the bypass passage;
   wherein a turbine shaft of the first turbocharger and a turbine shaft of the second turbocharger are arranged substantially in parallel to each other;
   wherein the inter-turbine passage extends substantially straight from the discharging port of the turbine of the first turbocharger toward the second turbocharger when viewed from a direction parallel to the turbine shafts of the first and second turbochargers so that the inter-turbine passage connects with an outer circumferential part of the turbine of the second turbocharger so as to extend in a direction tangent to an outer circumference direction of the turbine of the second turbocharger; and
   wherein the inter-turbine passage and the bypass passage are arranged to be juxtaposed so as to be mutually overlapping each other when viewed from a direction perpendicular to the turbine shafts of the first and second turbochargers and formed integrally with each other.

2. The turbo-charging apparatus of claim 1, wherein the inter-turbine passage, the bypass passage, and the introducing passage of the turbine of the first turbocharger integrally constitute an exhaust gas passage unit;
   wherein the exhaust gas passage unit includes a first part on a first turbocharger side and a second part on a second turbocharger side; and
   wherein the introducing passage for guiding exhaust gas from the vehicle engine to the turbine of the first turbocharger and a part of an exhaust passage for guiding exhaust gas from the vehicle engine to the turbine of the second turbocharger are formed within the first part of the exhaust gas passage unit.

3. The turbo-charging apparatus of claim 2, wherein the turbine of the first turbocharger is arranged below the turbine of the second turbocharger.

4. The turbo-charging apparatus of claim 2, wherein the control valve is provided between the first part and the second part of the exhaust gas passage unit.

5. The turbo-charging apparatus of claim 2, wherein a part of the inter-turbine passage on a turbine side of the second turbocharger has an oval shape in cross-section, and a long axis of the cross-section is oriented substantially orthogonal to a direction along the turbine shaft of the second turbocharger.

6. The turbo-charging apparatus of claim 1, wherein the turbine of the first turbocharger is arranged below the turbine of the second turbocharger.

7. The turbo-charging apparatus of claim 6, wherein the control valve is provided between a first part and a second part of an exhaust gas passage unit.

8. The turbo-charging apparatus of claim 6, wherein a part of the inter-turbine passage on a turbine side of the second turbocharger has an oval shape in cross-section, and a long axis of the cross-section is oriented substantially orthogonal to a direction along the turbine shaft of the second turbocharger.

9. The turbo-charging apparatus of claim 1, wherein the control valve is provided between a first part and a second part of an exhaust gas passage unit.

10. The turbo-charging apparatus of claim 9, wherein the control valve is a butterfly valve.

11. The turbo-charging apparatus of claim 10, wherein the first part and the second part of the exhaust gas passage unit are coupled to each other via an intermediate member; and
   a part of the bypass passage arranged with the control valve and a part of the inter-turbine passage are formed in the intermediate member.

12. The turbo-charging apparatus of claim 10, wherein a part of the inter-turbine passage on a turbine side of the second turbocharger has an oval shape in cross-section, and a long axis of the cross-section is oriented substantially orthogonal to a direction along the turbine shaft of the second turbocharger.

13. The turbo-charging apparatus of claim 9, wherein the first part and the second part of the exhaust gas passage unit are coupled to each other via an intermediate member; and a part of the bypass passage arranged with the control valve and a part of the inter-turbine passage are formed in the intermediate member.

14. The turbo-charging apparatus of claim 13, wherein a part of the inter-turbine passage on a turbine side of the second turbocharger has an oval shape in cross-section, and a long axis of the cross-section is oriented substantially orthogonal to a direction along the turbine shaft of the second turbocharger.

15. The turbo-charging apparatus of claim 9, wherein a part of the inter-turbine passage on a turbine side of the second turbocharger has an oval shape in cross-section, and a long axis of the cross-section is oriented substantially orthogonal to a direction along the turbine shaft of the second turbocharger.

16. The turbo-charging apparatus of claim 1, wherein a part of the inter-turbine passage on a turbine side of the second turbocharger has an oval shape in cross-section, and a long axis of the cross-section is oriented substantially orthogonal to a direction along the turbine shaft of the second turbocharger.

* * * * *